(12) United States Patent
Wallrafen

(10) Patent No.: US 6,445,176 B1
(45) Date of Patent: Sep. 3, 2002

(54) SELF-ADAPTIVE SENSOR UNIT FOR DETERMINING PULSE SWITCHING POINTS

(75) Inventor: Werner Wallrafen, Hofheim (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/634,510

(22) Filed: Aug. 9, 2000

(30) Foreign Application Priority Data

Aug. 9, 1999 (DE) .......................................... 199 36 763

(51) Int. Cl.[7] .......................... G01P 3/481; G01P 3/489; G01B 7/30; G01D 5/244
(52) U.S. Cl. .................. 324/166; 324/174; 324/207.12; 324/207.25; 123/406.6; 702/89; 702/145
(58) Field of Search ................................ 324/160, 163, 324/166–175, 202, 207.12–207.25; 702/89, 125, 145, 148; 123/406.59, 406.6, 406.64, 406.65, 146.5 A; 327/4

(56) References Cited

U.S. PATENT DOCUMENTS 5,451,867 A * 9/1995 Loreck et al. ............... 324/166
5,502,376 A * 3/1996 Busch ......................... 324/166
5,694,038 A * 12/1997 Moody et al. ............ 324/166 X
6,133,728 A * 10/2000 Manlove et al. ............ 324/166

FOREIGN PATENT DOCUMENTS

| DE | 39 36 831 | 8/1991 | ........... G01P/3/481 |
| DE | 44 34 180 | 3/1996 | ........... G01R/19/00 |
| DE | 195 12 613 | 10/1996 | ........... G01R/17/02 |
| DE | 195 20 690 | 12/1996 | ........... G01D/5/244 |
| EP | 0 615 111 | 9/1994 | ........... G01D/3/20 |

* cited by examiner

Primary Examiner—Gerard R. Strecker
(74) Attorney, Agent, or Firm—Cohen, Pontani, Lieberman & Pavane

(57) ABSTRACT

A magnetically sensitive sensor for counting pulses for measuring rotational speeds and angular positions of a rotating component via a pulse transmitter connected for rotating with the rotating component automatically adapts its switching points to the respective measurement location conditions. A logic unit initiates automatic adaptation of the switching points from an original state when an operating parameter first exceeds a limit value after the supply voltage of the sensor turned on. The original state is not preset or is coarsely preset. The configuration of the switching points is then stored in a non-volatile data memory specifically for the sensor.

9 Claims, 1 Drawing Sheet

SELF-ADAPTIVE SENSOR UNIT FOR DETERMINING PULSE SWITCHING POINTS

BACKGROUND OF THE INVENTION

1. Field of the Invention

The present invention relates to a sensor for counting pulses of a rotating pulse transmitter for measuring rotational speeds and angular positions of a rotating component to which the pulse transmitter is connected. More specifically, the present invention relates to a magnetically sensitive sensor for counting pulses of a magnetically acting pulse wheel, the sensor being equipped for automatically adapting its switching points to the respective measurement location conditions.

2. Description of the Related Art

In modern motor vehicles, precise determination of the rotational speeds of crankshafts and. camshafts is required. In addition, to reduce fuel consumption and for the purposes of diagnosis, it is also necessary to be able to ascertain the angular position of the crankshaft and camshaft quickly and precisely. For this purpose, magnetically sensitive sensors are arranged so as to be fixed in the immediate vicinity of a pulse wheel such as a gearwheel, magnetic pole wheel or similar magnetically active pulse transmitter which is made of ferroelectric material and fastened on the shaft to be monitored for rotation therewith.

When the pulse wheel comprises a passive pulse wheel such as a ferroelectric gearwheel, the sensor typically comprises a permanent magnet for producing a magnetic field. As the teeth of the gearwheel pass the permanent magnet during rotation, the magnetic field thereof is disturbed. Such a ferromagnetic wheel may comprise an undulatory or acutely delimited tooth structure at the periphery, or may comprise a perforated-plate ring.

If the pulse wheel comprises an active magnetic pole wheel, a multipolar magnetic field rotating at the rotational speed to be measured is produced. Such pole wheels may be provided with a plastic-bonded multipolar ring, a multipolar-magnetised ferromagnetic ring or with individual magnets arranged in annular fashion.

The sensor is fixedly mounted and records the magnetic flux which changes as a result of the rotation of the pulse wheel. The sensor outputs a voltage pulse when a clear signal edge of the magnetic flux occurs. By counting off the pulses occurring per unit of time, the rotational speed may be determined very precisely. A resolution which is essentially defined by the number of teeth on the gearwheel or by the number of poles on the pole wheel may be used to determine the angular position of the relevant shaft as well. To count the pulses, a switching point is used to determine when the pulses occur.

A particular problem of these known sensors is that the signal strength and the gradient of the signal edges decreases rapidly as the distance (clearance) between the sensor and the pulse wheel increases. In this way, installation tolerances or mechanical vibrations have a very pronounced effect. Furthermore, the sensor requires calibration of the switching points to the specific installation.

Other parameters such as, for example, angular offsets between the sensor and the pulse transmitter, tolerances in the flux density of the undisturbed magnetic field, positioning of the permanent magnets, influences of temperature, also affect the magnetic pulses and may detrimentally affect the count result or phase shifts.

Modern magnetically sensitive sensors have a correction mechanism, such as described, for example in Milano, Vig: "Self-Calibrating Hall Effect Gear Tooth Sensing Technology for Digital Powertrain Speed and Position Measurement", SENSOR 99 Proceedings I, which can be used for dynamically bringing the switching points, which serve to derive a binary output signal, in line with the shape of the edges of the magnetic pulses which occur, so that correct counting is still possible even with shallowing pulse edges and weaker pulses.

For high-precision, time-critical applications, such as determining the ignition instant of a motor vehicle engine, the above-mentioned dynamic correction (self-adaptation) of the switching points of a rotational speed sensor is too sluggish because the correction process takes too long. Furthermore, sensors equipped in this manner run through a start phase, during which their operation is imprecise. With rapid or cyclical changes in the aforementioned parameters caused by vibrations and mechanical jolts which motor vehicles components are regularly subjected to or by the pulse transmitter running eccentrically, the sensors react with an uncontrolled change of their switching points, subject to the dynamic correction, which results in losses of accuracy for the phase angle.

OBJECT OF THE PRESENT INVENTION

The object of the present invention is to provide a sensor which reliably and precisely measures rotational speed and rotational angle of a rotational component while avoiding the aforementioned problems of the prior art. Furthermore, the sensor should require no manual fine adjustment of the switching points at the fitting location.

The object of the present invention is achieved by the sensor having a logic unit which initiates automatic adaptation of an original state of switching points when the supply voltage of the sensor is turned on and an operating parameter exceeds its initial limit value for the first time. The state of the sensor is not preset or is coarsely preset. After the automatic adaptation, the configuration of the switching points is stored in a non-volatile data memory specifically for the sensor, for constant use.

In a first embodiment of the invention, the prescribed operating parameter is the rotational speed of the rotating component to be detected, and the limit value for said rotational speed is much greater than zero.

In a subsequent embodiment of the invention, the prescribed operating parameter is a temperature, and the limit value for said temperature is significantly above the ambient temperature.

To be able to use the sensor at different fitting locations, and for maintenance purposes, a refined embodiment of the invention provides that the original state can be restored by exerting an external influence.

To this end, provision may be made for the original state to be produced by the logic unit as soon as an output of the sensor is short-circuited to a negative or positive pole of the sensor's supply voltage (short-circuit monitoring). When the fitting location is changed or in the course of maintenance work, the sensor may thus be easily reset. After the reset, the sensor readjusts itself again when it is next started up. In this context, it is advantageous if the supply voltage is situated outside the nominal operating voltage.

For permanently storing switching points once they have been determined, provision may be made for the non-volatile memory to be an electrically erasable memory, in particular an EEPROM. To reset the sensor, the memory content can be erased in a simple manner which is known per se.

To avoid undesirable influences of temperature on the measurement result, provision may be made for the sensor to have constantly active temperature compensation for the switching points.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawing shows a block diagram of a sensor according to an embodiment of the present invention.

DETAILED DESCRIPTION OF THE PRESENTLY PREFERRED EMBODIMENTS

Figure 1:
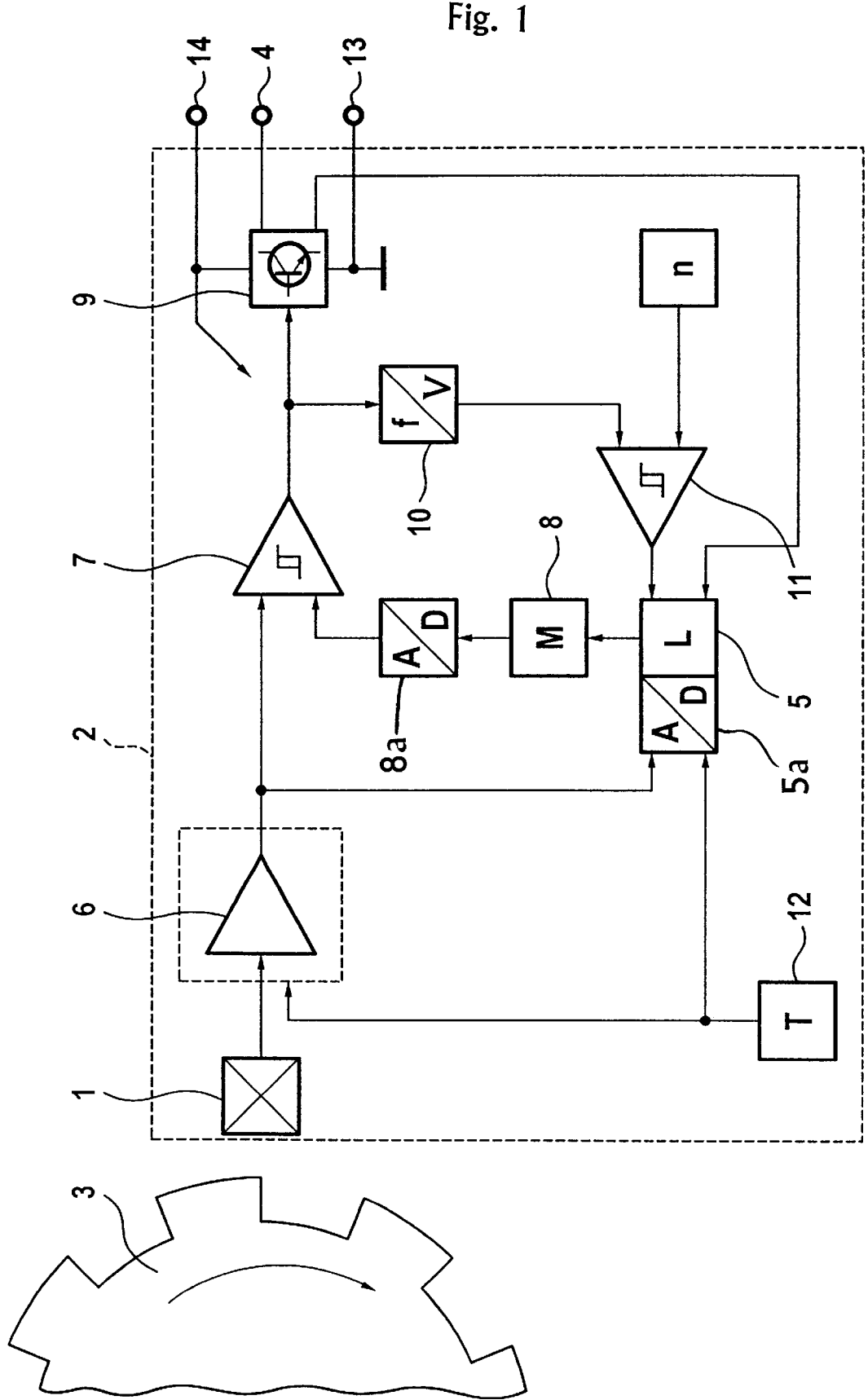

In the drawing, a rotational speed sensor 2 according to the present invention is shown with a detector element 1 arranged adjacent to a pulse wheel 3 made of ferromagnetic material. The sensor 2 records the disturbances, produced by the pulse wheel 3. In a preferred embodiment, the detector element 1 comprises a Hall effect detector with a permanent magnet incorporated therein. The sensor 2 generates a signal in re sponse to a change in the magnetic field in the Hall effect detector 1 and transmits an appropriate binary voltage signal via an output terminal 4.

Alternatively, the detector 1 may comprise a magneto-resistive resistor instead of a Hall effect detector. Furthermore, if the pulse wheel 3 comprises a magnetic pole wheel, the permanent magnet in the Hall effect detector is not required and may be dispensed with.

For control purposes and for automatically setting the switching points, the sensor 2 further comprises a logic circuit 5 with an analog/digital converter 5a. The logic circuit 5 may also be in the form of a microprocessor.

The signal generated by the detector 1 is transmitted to an amplifier 6 and the amplified signal is input to a comparator 7. The amplified signal is compared to switching points stored in an EEPROM memory 8 of the sensor which is connected to the comparator 7 via a digital/analog converter 8a. The resultant binary signal is supplied to the output 4 via an output stage 9, which in this case is shown in simplified form as a transistor and contains a short-circuit protection circuit. The sensor 2 receives an operating voltage at terminal 14 and further comprises a ground terminal 13 connected to ground.

The amplified signal is also connected to the analog/digital converter 5a of the logic circuit 5. When the sensor 2 is initiated, the switching points of the sensor 2 are newly determined once by the logic circuit 5, in a manner which is known per se, when the frequency of the output signal present downstream of the comparator 7 exceeds a limit value n stored in the sensor. This limit value n is below the actual operating rotational speed of the component which is to be monitored. For this purpose, the output signal downstream of the comparator 7 is connected to a frequency/voltage converter 10 and the outputs of the frequency/voltage converter 10 and the limit value n are compared using a further comparator 11. The result is supplied to the logic circuit 5, which then decides whether the sensor switching points need to be set again. Newly determined switching points are stored by the logic circuit in the EEPROM memory 8 for further use. Although it is shown separately, the limit value n may be stored in the EEPROM memory 8 or in a separate memory in the sensor 2.

The above measures allow the sensor 2 to be used after a short time at any desired fitting location that is suitable without manual fine adjustment, since the necessary adjustment (setting of the switching points) takes place in fully automated fashion as soon as the relevant component has been put into operation for the first time and its rotational speed has exceeded the limit rotational speed n.

To compensate for influences of temperature, a further provision of this illustrative embodiment is that the measured signal from a temperature sensor 12 may be supplied both to the logic circuit 5 and to the amplifier circuit 6 for consideration. A further temperature signal relating to the operating temperature near to where the sensor is fitted may be used to start the adjustment procedure instead of the rotational speed signal or in conjunction with the rotational speed signal.

To reset an already adjusted sensor 2 to the original state, for example when the fitting location is changed or during possible regular manual or fully automatic maintenance, a provision of the illustrative embodiment is that the output be connected briefly to the supply voltage at 14 or to ground at 13. This short circuit is recorded by the logic circuit 5, which then erases the EEPROM memory 8 and thereby places the sensor in the original state.

To prevent unwanted resetting to the original state when there is a short circuit in the event of a fault, the supply voltage may also be tested as a second criterion. Deliberate resetting to the original state should be enabled only if the supply voltage is situation outside the nominal operating voltage at the same time.

The invention is not limited by the embodiments described above which are presented as examples only but can be modified in various ways within the scope of protection defined by the appended patent claims.

I claim:

1. A sensor for measuring rotational speeds and angular positions of a rotating component, comprising:

a pulse transmitter comprising a magnetically acting pulse wheel operatively arrangeable for rotation with the rotating component;

a non-volatile data memory for storing switching points;

a limit value memory storing a limit value;

a magnetically sensitive detector for generating an output signal in response to the position of the pulse transmitter and counting pulses during rotation of said pulse transmitter, said magnetically sensitive detector using said output signal and the switching points to determine the occurrence of pulses; and a logic unit operatively connected to said magnetically sensitive detector for initiating automatic determination of the switching points to be used based on the output signal level when the non-volatile memory is in an original state in which the switching points are not present in the non-volatile memory and when an operating parameter of the output signal exceeds the limit value for the first time after a supply voltage for the sensor is turned on, wherein the determined switching points are stored in said non-volatile data memory for continued use.

2. The sensor of claim 1, wherein said operating parameter comprises a rotational speed of the rotating component to be detected, and wherein said limit value for said rotational speed is much greater than zero.

3. The sensor of claim 2, wherein said operating parameter also comprises a temperature, and wherein said limit value for said temperature is significantly above ambient temperature.

4. The sensor of claim 1, wherein said operating parameter comprises a temperature, and wherein said limit value for said temperature is significantly above ambient temperature.

5. The sensor of claim 1, wherein said logic circuit is operatively arranged for restoring the original state of the sensor in response to exertion of an external influence.

6. The sensor as claimed in claim 5, wherein said logic circuit is operatively arranged for restoring the original state when an output of said sensor is short-circuited to one of a negative and positive pole of said supply voltage.

7. The sensor as claimed in claim 6, wherein a value of the supply voltage is situated outside the nominal operating voltage of the output of said sensor.

8. The sensor of claim 1, wherein said non-volatile data memory comprises an electrically erasable memory.

9. The sensor of claim 1, further comprising a constantly active temperature compensation for said switching points.

* * * * *